United States Patent
Kubota et al.

(10) Patent No.: US 6,845,649 B2
(45) Date of Patent: Jan. 25, 2005

(54) ROTATIONAL ANGLE OUTPUT REGULATING METHOD

(75) Inventors: Takamitsu Kubota, Kariya (JP); Naoyuki Kamiya, Kariya (JP); Hirofumi Hagio, Handa (JP); Takashi Hamaoka, Kariya (JP)

(73) Assignee: Denso Corporation, Aichi-Pref. (JP)

( * ) Notice: Subject to any disclaimer, the term of this patent is extended or adjusted under 35 U.S.C. 154(b) by 168 days.

(21) Appl. No.: 10/163,870

(22) Filed: Jun. 7, 2002

(65) Prior Publication Data

US 2002/0166362 A1 Nov. 14, 2002

Related U.S. Application Data

(63) Continuation-in-part of application No. 09/730,802, filed on Dec. 7, 2000, now abandoned.

(30) Foreign Application Priority Data

Dec. 8, 1999 (JP) .......................................... 11-348357

(51) Int. Cl.[7] .............................................. G01C 17/38
(52) U.S. Cl. ...................................................... 73/1.75
(58) Field of Search .............................. 73/118.1, 1.75, 73/1.79, 1.88; 324/207.25, 205

(56) References Cited

U.S. PATENT DOCUMENTS

| | | |
|---|---|---|
| 4,669,052 A | 5/1987 | Bianco |
| 5,157,956 A | 10/1992 | Isaji et al. |
| 5,332,965 A | 7/1994 | Wolf et al. |
| 5,844,138 A | 12/1998 | Cota |

FOREIGN PATENT DOCUMENTS

| | | |
|---|---|---|
| DE | 3128095 A1 | 2/1983 |
| EP | 0514634 A1 | 11/1992 |
| EP | 0733881 A2 | 9/1996 |
| FR | 1509388 | 3/1968 |
| JP | 62-185138 | 8/1987 |
| JP | 6-180237 | 6/1994 |
| JP | 7-260511 | 10/1995 |
| JP | 8-14883 | 1/1996 |
| JP | 10-293043 | 11/1998 |

OTHER PUBLICATIONS

Kondraske et al., "A Microprocessor–Based System for Adaptable Calibration and Linearization of Hall–Effect Position Sensors," IEEE Transaction on Instrumentation and Measurement, vol. IM–35, No. 3 (Sep. 1986), pp. 338–343.

*Primary Examiner*—Robert Raevis
(74) *Attorney, Agent, or Firm*—Nixon & Vanderhye PC

(57) ABSTRACT

A method for calibrating a rotation angle sensor having a magnet, a magnetic detector disposed in a magnetic field of the magnet for outputting a detected value indicative of a direction of the magnetic field that varies in accordance with a rotation angle of a rotatable member, and an output circuit which transforms the detected value to an output value in accordance with a transforming characteristic and outputs the output value, the method entailing: assembling the magnet, the magnetic detector and the output circuit to a device that has the rotatable member; rotating the rotatable member to a predetermined reference angle; measuring the detected value or the output value as a measured value when the rotatable member is at the reference angle; and setting the transforming characteristic based on the measured value so that the output circuit outputs a reference output value at the reference angle.

13 Claims, 12 Drawing Sheets

ROTATIONAL ANGLE OUTPUT REGULATING METHOD

This application is a continuation division continuation-in-part of application Ser. No. 09/730,802, filed Dec. 7, 2000, now abandoned, the entire content of which is hereby incorporated by reference in this application.

CROSS-REFERENCE TO RELATED APPLICATION

The present invention is related to Japanese patent application No. Hei. 11-348357, filed Dec. 8, 1999; the contents of which are incorporated herein by reference.

FIELD OF THE INVENTION

The present invention relates to a regulating method for obtaining a desired output from a rotational angle sensor, and more particularly, to a regulating method for obtaining a desired output from a rotational angle sensor having a non-contact type sensing element which functions to detect a rotational angle of a rotary member.

BACKGROUND OF THE INVENTION

A contact type sensor is known using a sliding resistor and a sliding contact. With this conventional rotational angle sensor alone, a procedure is performed of regulating and confirming an output corresponding to a rotational angle during the mounting of the sensor to a throttle valve. In this final step, the sensor side is rotated relative to the throttle valve side by utilizing a long hole formed in the rotating direction. Thereafter both are fixed to each other.

In the above conventional sensor, however, it is necessary that mounting adjustment be done at least twice between the throttle valve side and the sensor side, thus giving rise to the problem of too many adjusting steps. Besides, the regulation of an output gradient gain is performed only in a discrete state of the sensor and the final mounting of the sensor to the throttle valve side is performed by a one-point adjustment, with the result that the rotational angle detecting accuracy is low. Further, in the case of a contact type sensor using a sliding resistor and a sliding contact, it is difficult to diminish variations in the printing accuracy (e.g., film thickness and width) during the fabrication of the resistor.

SUMMARY OF THE INVENTION

The present invention has been accomplished for solving the above-mentioned problems and it is an object of the invention to provide a rotational angle output regulating method capable of improving the output accuracy while decreasing the number of steps in regulating a rotational angle output.

In the rotational angle output regulating method according to a first aspect of the invention, a non-contact type sensing element for detecting a rotational angle of a rotary member by utilizing a magnetic force of a magnet fixed to a shaft of the rotary member is mounted opposite to the magnet. Thereafter, the shaft portion of the rotary member is rotated to adjust and temporarily fix the rotary member to a predetermined rotational angle, and an output value corresponding to the predetermined rotational angle of the rotary member is written into the sensing element from the exterior. Thus, the regulation of the output value corresponding to the rotational angle of the rotary member is made in only the final stage after mounting the non-contact type sensing element. Hence, there is obtained an effect that the number of steps for output regulation is decreased.

In the rotational angle output regulating method according to a second aspect of the invention, there is one specific write point in writing the rotational angle output value of the rotary member into the non-contact type sensing element and a gradient corresponding thereto is preset and stored to calculate an output value at another point. Thus, output regulation is easy and output accuracy is improved.

In the rotational angle output regulating method according to a third aspect of the invention, there are two specific write points in writing rotational angle output values of the rotary member into the sensing element and all that is required is merely writing the rotational angle output values of the rotary member at the two specific points into the non-contact type sensing element in two steps repeatedly. A liner interpolation between the two points is made to calculate an output value at another point. Thus, there is obtained an effect that the output regulation is easy and the output accuracy is improved.

In the rotational angle output regulating method according to a fourth aspect of the invention, there are three specific write points in writing rotational angle output values of the rotary member into the non-contact type sensing element and all that is required is merely writing the rotational angle output values of the rotary member at the three specific points into the non-contact type sensing element in three steps repeatedly. A linear approximate interpolation among the three points is made to calculate an output value at another point. Thus, there is obtained an effect that the output regulation is easy and the output accuracy is improved.

In the rotational angle output regulating method according to a fifth aspect of the invention, there are three specific write points in writing rotational angle output values of the rotary member into the non-contact type sensing element and all that is required is merely writing the rotational angle output values at the three specific points into the non-contact type sensing element in three steps repeatedly. A linear interpolation between adjacent two points out of the three points is made to calculate an output value at another point, allowing easy output regulation and improved output accuracy.

In the rotational angle output regulating method according to a sixth aspect of the invention, the shaft portion of the rotary member is a rotary shaft of a throttle valve in an internal combustion engine. One of write points in writing output values corresponding to throttle valve openings into the non-contact type sensing element is set particularly to a low opening position or a fully closed position, and all that is required is merely writing output values corresponding to throttle valve openings at write points including the low opening position into the non-contact type sensing element repeatedly by the number of write points.

In the rotational angle output regulating method according to a seventh aspect of the invention, the shaft portion of the rotary member is a rotary shaft of a throttle valve in an internal combustion engine. One of the write points in writing output values, corresponding to throttle valve opening positions, into the non-contact type sensing element is set to a position rotated to an open side by a predetermined degree of throttle valve opening from an initial opening position. This is for specifying it as a fully closed position of the throttle valve opening, and all that is required is merely writing output values corresponding to throttle valve openings at write points including the set position into the non-contact type sensing element by the number of write points. As a result, easy output adjustment and improved output accuracy of an output value in the vicinity of the set fully closed position is accomplished.

In the rotational angle output adjusting method according to an eighth aspect of the invention, the shaft portion of the rotary member is a rotary shaft of a throttle valve in an internal combustion engine. One of the write points in writing output values corresponding to throttle valve openings into the non-contact type sensing element is set to an initial opening position as a throttle valve opening position in an ON condition of an ignition switch in the internal combustion engine, the initial opening position being updated at every start-up of the internal combustion engine, and another output value of a throttle valve opening is corrected and calculated correspondingly to the initial opening position. Accordingly, for example, even if the initial opening position varies with the lapse of time, an output value from the non-contact type sensing element is corrected properly.

In another aspect of the present invention, a method for calibrating a rotation angle sensor comprises the steps of: assembling the magnet, the magnetic detector and the output circuit to a device that has the rotatable member; rotating the rotatable member to a predetermined reference angle; measuring the detected value or the output value as a measured value when the rotatable member is at the reference angle; and setting the transforming characteristic based on the measured value so that the output circuit outputs a reference output value at the reference angle. The rotation angle sensor has a magnet, a magnetic detector disposed in a magnetic field of the magnet for outputting a detected value indicative of a direction of the magnetic field that varies in accordance with a rotation angle of a rotatable member, and an output circuit which transforms the detected value to an output value in accordance with a transforming characteristic and outputs the output value.

Additionally, the reference angle can be one of a plurality of reference angles, a plurality of measured values are measured by repeating the rotating and measuring steps with respect to the reference angles, and the transforming characteristic is set based on the plurality of measured values in the setting the transforming characteristic step. The rotatable member can be a throttle valve for an engine, and the reference angle can be set on a full-closed position of the throttle valve or approximately the full-closed position. The rotatable member can be a throttle valve for an engine, which is rotatable to a full-open position, a full-closed position, and an opener position, and the reference position can be set on the opener position. Alternatively, the rotatable member is a throttle valve for an engine, and the reference angle is set on a full-open position of the throttle valve or a vicinity of the full-open position and a transforming characteristic is defined by a functional equation, a coefficient of the functional equation, and a constant of the functional equation, and the coefficient and the constant are set in the setting the transforming characteristic step.

Alternatively, a method for calibrating a throttle valve device may comprise the steps of: assembling the throttle valve, the internal motor, the rotation angle detector, and the output circuit into the throttle valve device; connecting an external motor with the throttle valve, and an external calibrating circuit with the output circuit; measuring the detected value or the output value as a measured value by the external calibrating circuit, the measured value being measured when the throttle valve is rotated to a reference angle by the external motor; defining a transforming characteristic by the external calibrating circuit based on the measured value and a reference output value to be output at the reference angle, the transforming characteristic being defined so that the output circuit outputs the reference output value at the reference angle; setting the defined transforming characteristic into the setting circuit from the external calibrating circuit; and disconnecting the external motor and the external calibrating circuit from the throttle valve device.

The throttle valve device may have a connecting portion in which the external motor is connected, and a cover member for covering the connecting portion, and the method may further comprise assembling the cover member to the throttle valve device after the disconnecting step. The measured value may be one of a plurality of measured values measured by repeating the measuring step, and the transforming characteristic may be defined based on the plurality of measured values. Finally, the transforming characteristic may include a functional equation and a coefficient of the functional equation, and the coefficient may be set in the setting step.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from the detailed description.

BRIEF DESCRIPTION OF THE DRAWINGS

The present invention will become more fully understood from the detailed description and the accompanying drawings, wherein.

DETAILED DESCRIPTION OF THE INVENTION

Figure 1:
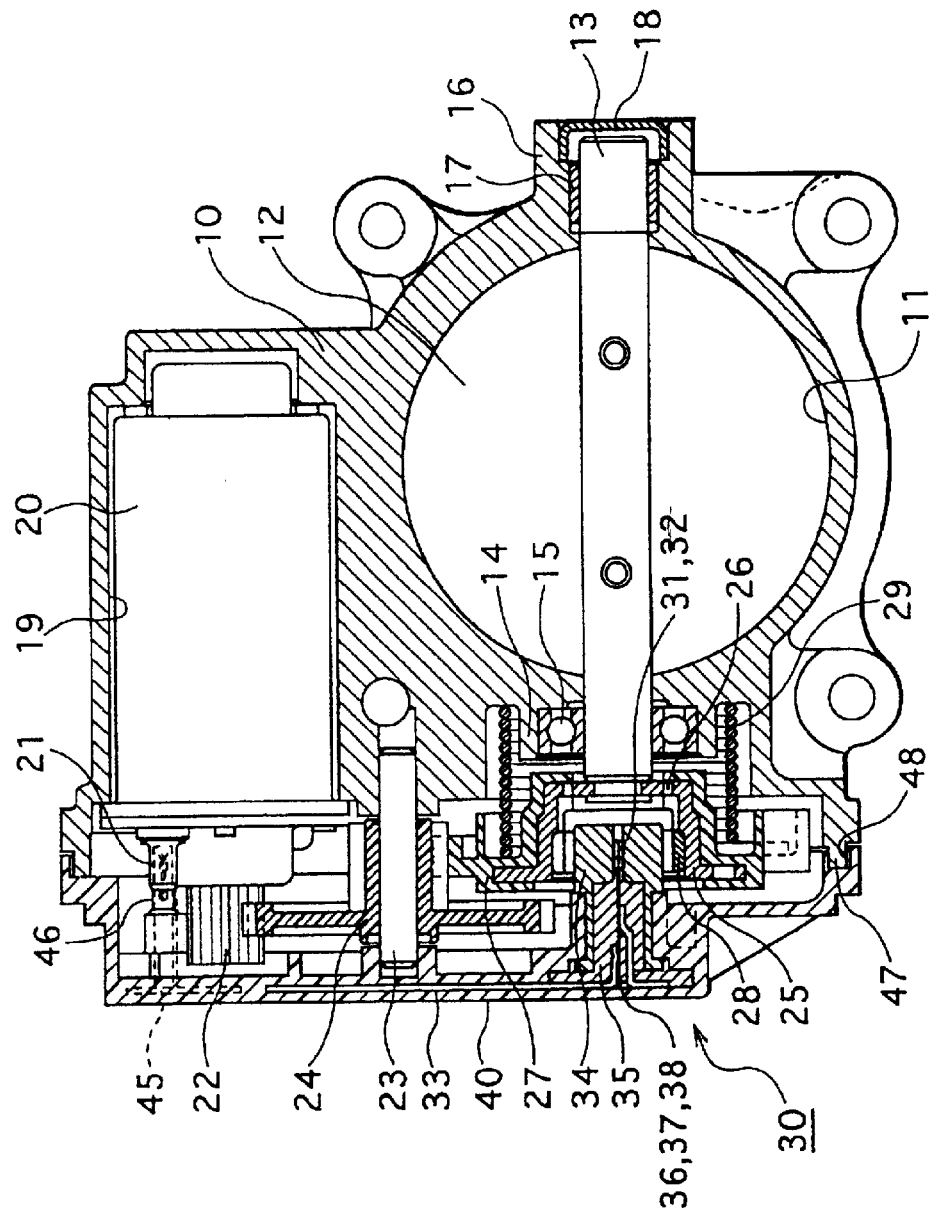
FIG. 1 is a cross-sectional view of an intake volume control apparatus for an internal combustion engine according to the present invention.
Figure 2:
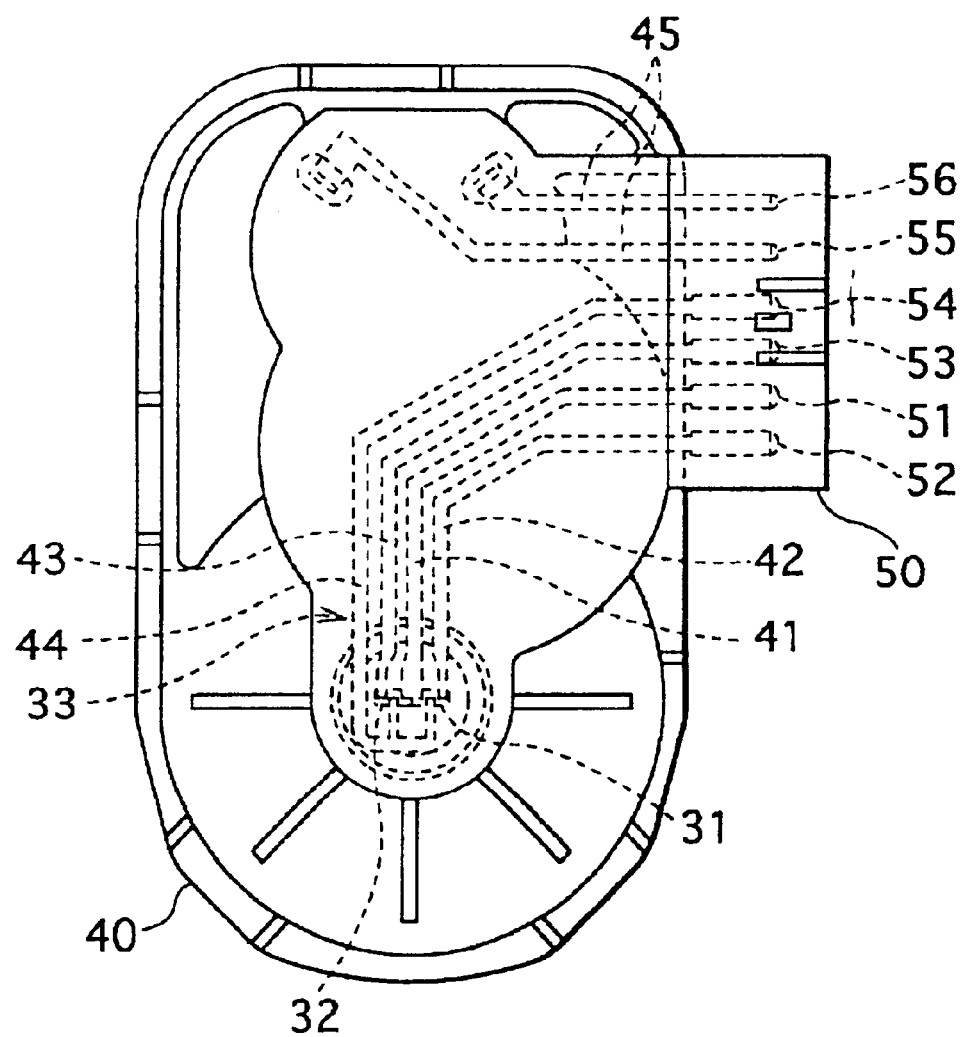
FIG. 2 is a plan view of an intake volume control apparatus for an internal combustion engine according to the present invention.

FIG. 1 is a cross-sectional view showing an entire construction of an intake volume control apparatus for an internal combustion engine to which a rotational angle output regulating method according to an embodiment of the present invention is applied. FIG. 2 is a left side view of FIG. 1.

In FIG. 1, the intake volume control apparatus for an internal combustion engine mainly comprises a throttle body 10 in which an intake passage 11 to the internal combustion engine (not shown) is formed, a generally disc-like throttle valve 12 fixed rotatably onto a rotary shaft 13 within the intake passage 11, an electric motor 20 geared to the rotary shaft 13, and a throttle opening sensor 30 for detecting the degree of opening of the throttle valve 12 as a rotational angle of the throttle valve. An output signal provided from the throttle opening sensor 30 is fed to an ECU (Electronic Control Unit), in which a drive signal is obtained by calculation according to an operating condition of the internal combustion engine. With the resulting rotation of the electric motor 20, the throttle valve 12 is controlled to a desired degree of opening.

The throttle body 10, which is formed by an aluminum die casting, is fixed to an intake manifold (not shown) in the internal combustion engine, using bolts or the like. One end of the throttle valve 12 is carried rotatably on a ball bearing 15 which is held by a bearing holder portion 14 of the throttle body 10. An opposite end of the throttle valve 12 is carried rotatably on a thrust bearing 17 which is held by a bearing holder portion 16 of the throttle body 10. A cap 18 is fitted in the bearing holder portion 16 of the throttle body 10. The throttle valve 12 is rotated in the intake passage 11 of the throttle body 10 and the intake volume (the amount of air to be introduced) into the internal combustion engine is adjusted by the resulting gap.

The electric motor 20 is accommodated within a motor receptacle portion 19 formed in the throttle body 10. A motor energizing terminal 21 is projected from the electric motor 20 and a pinion gear 22 is fitted on a front end of an output shaft of the motor. A rotor 25 is fixed onto one end of the rotary shaft 13 of the throttle valve 12 and a resin gear 27 is insert-molded to the rotor 25. A cylindrical permanent magnet 28 which constitutes a throttle opening sensor 30 is bonded to an inner peripheral surface of the rotor 25. The pinion gear 22 meshes with the resin gear 27 via an intermediate reduction gear 24 adapted to rotate about a fixed shaft 23 which is fixed to the throttle body 10. On an outer periphery side of the resin gear 27, integral with the rotor 25, is mounted a coiled return spring 29 for restoring the throttle valve 12 to an initial opening position thereof via the rotary shaft 13 when an ignition switch (not shown) is turned OFF to stop the supply of electric current to the electric motor 20. In the rotor 25, a positioning hole 26 is aligned with and fixed to an idle position with respect to the rotary shaft 13.

The throttle opening sensor 30 is made up of a cylindrical permanent magnet 28 as a magnetic field generating source, two Hall ICs 31 and 32 as a dual system, non-contact type sensing elements molded integrally with a sensor cover 40, a lead frame 33 having an electrically conductive thin metallic sheet for electrical connection between the Hall ICs 31, 32 and an external ECU, and a split type stator 34 formed of a magnetic material which concentrates a magnetic flux to the Hall ICs 31 and 32.

The two Hall ICs 31 and 32 are disposed in opposition to an inner periphery side of the permanent magnet 28 so that, upon occurrence of magnetic fields of N or S pole on their sensing surfaces, there are generated electromotive forces [(+) potential for N-pole magnetic field or (−) potential for S-pole field] sensitive to the generated magnetic fields. The Hall ICs 31 and 32 used in this embodiment are arranged side by side in 180° opposite directions.

For example, as shown in FIG. 2, the lead frame 33 is formed by an electrically conductive thin copper sheet and is composed of a signal input terminal (VDD) 41 to which is applied a battery voltage of 5[V], output take-out terminals (OUT1, OUT2) 42 and 43 for taking out throttle opening signals from the throttle valve 12, and an earth terminal (GND) 44. A connection between leads of the two Hall ICs 31 and 32, which are a signal input lead (VDD) 36, an earth lead (GND) 37 and output take-out leads (OUT1, OUT2) 38, and the lead frame 33 is coated with a connection holder 35 formed of a thermoplastic resin such as PBT.

The stator 34, which is split in two, is fitted and fixed onto an outer periphery side of the connection holder 35 and a predetermined gap is ensured between the stator 34 and the two Hall ICs 31, 32.

The sensor cover 40, which closes an open side of the throttle body 10, is a resin-molded cover produced by molding a thermoplastic resin such as PBT which is lightweight, easy to manufacture and inexpensive and which insulates between terminals of the throttle opening sensor electrically. The sensor cover 40 is formed with a concave portion 48 for engagement with a convex portion 47 formed on the open side of the throttle body 10 and it is combined with the throttle body 10 with a clip (not shown). Thus, since the convex portion 47 of the throttle body 10 and the concave portion 48 of the sensor cover 40 are fitted together, a positional relation between the two Hall ICs 31, 32 disposed and fixed on the sensor cover 40 side and the permanent magnet 28 disposed and fixed on the inner periphery side of the rotor 25 which rotates integrally with the rotary shaft 13 of the throttle valve 12 journalled rotatably in the throttle body 10 is compensated.

As shown in FIG. 2, a connector portion 50 is formed by molding integrally with a side face of the sensor cover 40 and it is composed substantially of tip portions 51–54 of the signal input terminal 41, output take-out terminals 42, 43 and earth terminal 44 formed on the lead frame 33 side, and tip portions 55 and 56 of motor current-conducting terminals 45 of the electric motor 20. Motor connecting terminals 46 are integrally bonded to opposite ends of the motor current-conducting terminals 45, and in a combined state of the throttle body 10 and the sensor cover 40 the motor energizing terminal 21 of the electric motor 20 is connected to the motor current-conducting terminals 45 via the motor connecting terminals 46.

Figure 3:
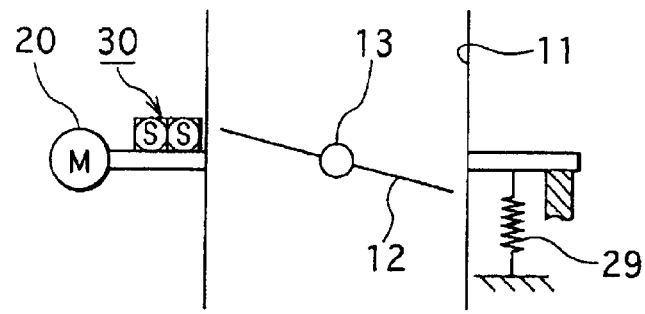
FIG. 3 is a schematic diagram showing an partially open position of a throttle valve in the intake volume control apparatus according to the present invention.
Figure 4:
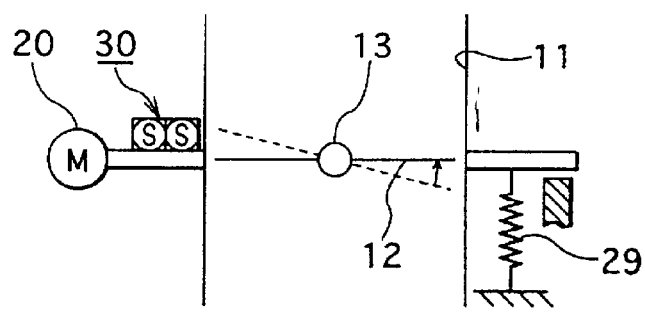
FIG. 4 is a schematic diagram showing a fully closed position of the throttle valve for an intake volume control apparatus for an internal combustion engine according to the present invention.

FIGS. 3, 4, 5, and 6 are schematic diagrams showing specific opening positions of the throttle valve 12 in the intake volume control apparatus for an internal combustion engine described above. The intake volume control apparatus illustrated in those figures is of a so-called overturn type in which the throttle valve 12 is opened and closed in the range from a fully open position (90°) (FIG. 6) to an initial opening position (−10°) (FIG. 3, also referred to simply as the "partially open position" or the "opener" position) after passing a fully closed position (0°) (FIG. 4).

Figure 5:
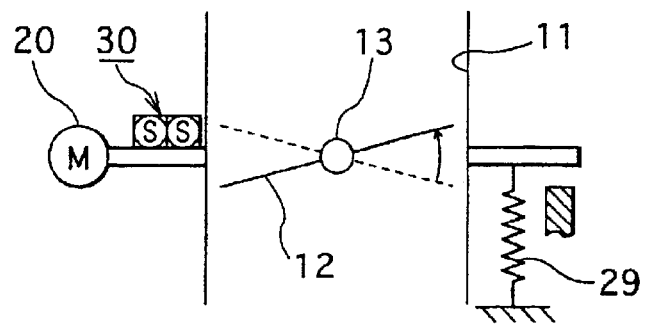
FIG. 5 is a schematic diagram showing a low opening position of the throttle valve in the intake volume control apparatus according to the present invention.
Figure 6:
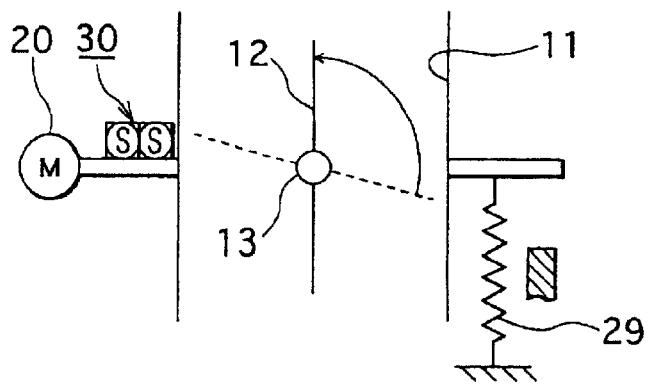
FIG. 6 is a schematic diagram showing a fully open position of the throttle valve in the intake volume control apparatus.

FIG. 3 shows a state in which the supply of an electric current to the electric motor 20 is stopped, the rotary shaft 13 of the throttle valve 12 is restored into abutment against a stopper (hatched area) on the throttle body 10 side, and the throttle valve 12 is open. FIG. 4 shows a state in which the throttle valve 12 is in the fully closed position to minimize the amount of air introduced into the internal combustion engine. FIG. 5 shows a state in which the throttle valve 12 is in a low opening position to provide an intake volume for idling of the internal combustion engine. Further, FIG. 6 shows a state in which the throttle valve 12 is in the fully open position as a specific opening position thereof to maximize the amount of air introduced into the internal combustion engine.

Now, with reference to FIGS. 3, 4, 5, and 6 as necessary, the following description is provided about adjusting the output of the throttle opening sensor mounted to the intake volume control apparatus for an internal combustion engine in this embodiment. First, a description will be given about adjusting the output of the throttle opening sensor 30 by two-point write with reference to FIGS. 1 and 7.

In the completely mounted state of the intake volume control apparatus for an internal combustion engine shown in FIG. 1, an encoder (not shown) is connected to a slit portion (not shown) of the rotary shaft 13 when the cap 18 is removed from the throttle body 10. The rotary shaft 13 is rotated to give throttle openings (degrees) [°] at two specific points (points A and B) and is fixed temporarily at each point. Predetermined regulated outputs V1 and V2 [V] in the Hall ICs 31 and 32 corresponding to the throttle openings at points A and B are written.

More specifically, the regulated outputs V1 and V2 as write signals are written from an externally connected program board (not shown) using the signal input terminal (VDD) 41 and output take-out terminal (OUT1) 41 for the Hall IC 31 and using the signal input terminal (VDD) 41 and output take-out terminal (OUT2) 43 for the Hall IC 32. At the same time, write processings such as temperature characteristic correction, gain correction, and offset correction are performed. Thereafter, the encoder and the program board are removed and the cap 18 is fitted in the throttle body 10. The output regulating work is now over.

Thus, all that is required for the output regulation by two-point write in the throttle opening sensor 30 is merely turning the rotary shaft 13 to the throttle openings at two specific points, subsequent temporary fixing, and writing write signals corresponding to those points.

Figure 7:
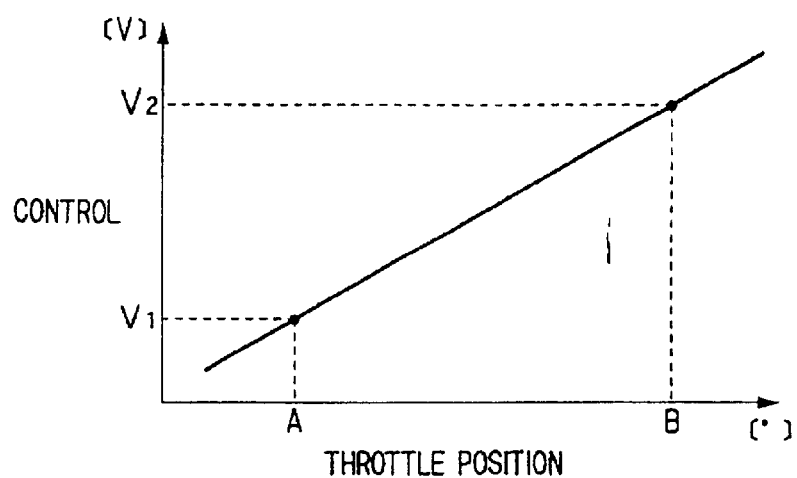
FIG. 7 is a graphical view of an output regulation by two-point write in a throttle opening sensor mounted to the intake volume control apparatus.

Based on the regulated outputs V1 and V2 at the two specific points (points A and B) thus written, an output value from the throttle opening sensor 30 corresponding to the throttle opening at another point is calculated by a linear interpolation, as shown in FIG. 7. By setting the two specific points (A and B) in the above throttle openings to the fully closed position shown in FIG. 4 and the fully open position shown in FIG. 6, respectively, it is possible to calculate an appropriate output value for the throttle opening at another point.

Thus, the rotational angle output regulating method of this embodiment comprises a first step of mounting Hall ICs 31 and 32 (non-contact type sensing elements for detecting the degree of opening of the throttle valve 12 by utilizing the magnetic force of the permanent magnet 28) opposite to the permanent magnet which rotates integrally with the rotary shaft 13, which is a rotating shaft of throttle valve 12. A subsequent second step includes adjusting the degree of opening of the throttle valve 12 to a predetermined value with an encoder connected to the rotary shaft 13 and temporarily fixing the valve to that position. A third step includes writing an output value corresponding to the temporarily fixed, predetermined degree of opening of the throttle valve 12 into the Hall ICs 31 and 32 through a program board connected to the signal input terminal (VDD) 41 and output take-out terminals (OUT1) 42 and (OUT2) 43.

According to the rotational angle output regulating method of this embodiment, when there are two specific write points of output values corresponding to predetermined throttle positions of the throttle valve 12, the second and third steps are repeated twice successively and an output value at another point is calculated by a linear interpolation between the two points thus written.

Specifically, after the Hall ICs 31 and 32 are mounted in opposition to the permanent magnet 28, the rotary shaft 13 is rotated to adjust the throttle valve 12 to a predetermined throttle opening, the throttle valve is temporarily fixed to this position, and an output value corresponding to this throttle opening is written into the Hall ICs 31 and 32 from the exterior. Thus, the output value writing operation for the throttle valve opening is in only the final stage after mounting the Hall ICs 31 and 32.

When there are two specific write points in writing throttle opening output values of the throttle valve 12 into the Hall ICs 31 and 32, all that is required for output regulation is merely writing the throttle opening output values of the throttle valve at the two specific points into the Hall ICs 31 and 32 in two steps repeatedly, and an output value at another point is calculated by a linear interpolation between the two points. Thus, the output regulation is easy and it is possible to improve the output accuracy.

When there is one specific write point in writing an output value corresponding the throttle opening of the throttle valve 12 into the Hall ICs 31 and 32, an output value at another point can be calculated by presetting and storing a gradient corresponding thereto, whereby the Same effect as above can be expected.

Figure 8:
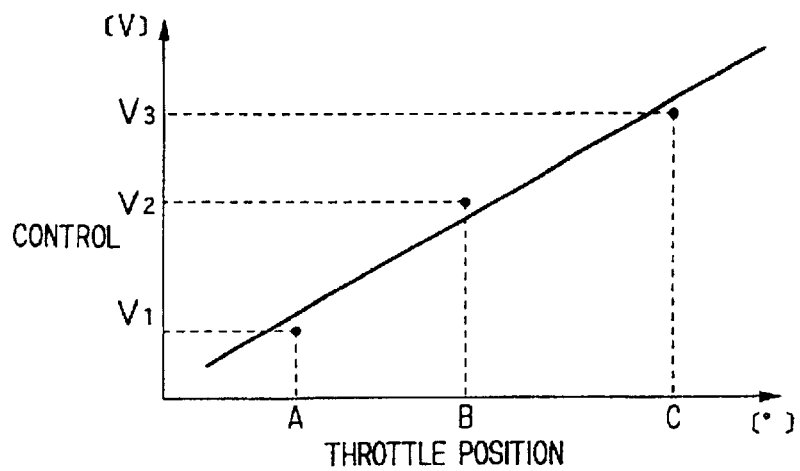
FIG. 8 is a diagram showing output regulation by three-point write in the throttle opening sensor for an intake volume control apparatus for an internal combustion engine according to the present invention.

Now, with reference to FIGS. 1 and 8, the following description is provided about output regulation by three-point write in the throttle opening sensor 30 mounted to the intake volume control apparatus for an internal combustion engine according to this embodiment.

When the intake volume control apparatus for an internal combustion engine, shown in FIG. 1, is mounted and with the cap 18 removed from the throttle body 10, an encoder (not shown) is connected to a slit portion (not shown) of the rotary shaft 13. Then, the rotary shaft 13 is rotated to provide throttle openings (degrees) [°] of the throttle valve 12 of three specific points (A, B, C) and is fixed temporarily at each point. Predetermined regulated outputs V1, V2, and V3

[V] corresponding to the throttle openings at the three points A, B, and C, respectively, are written in the Hall ICs 31 and 32. In this case, the regulated outputs V1, V2, and V3 as write signals are written through an externally connected program board (not shown) using the signal input terminal (VDD) 41 and output take-out terminal (OUT1) 41 for the Hall IC 31 and using the signal input terminal (VDD) 41 and output take-out terminal (OUT2) 43 for the Hall IC 32. At the same time, such write processings as temperature characteristic correction, gain correction, and offset correction are carried out. Thereafter, the encoder and the program board are removed and the cap 18 is fitted in the throttle body 10. The output regulating work is now over.

Thus, all that is required in the output regulating work by three-point write in the throttle opening sensor 30 is merely rotating the rotary shaft 13 successively to the throttle valve openings at three specific points, fixing it to each of those throttle openings temporarily, and writing write signals corresponding to those points. Based on the regulated outputs V1, V2, and V3 at the three specific points (A, B, C) thus written, an output value from the throttle opening sensor 30 at another point is calculated by a linear approximate interpolation, as shown in FIG. 8. If the three specific points (A, B, C) as throttle valve positions are set to, for example, the partially open position shown in FIG. 3, the fully closed position shown in FIG. 4, and the fully open position shown in FIG. 6, respectively, an appropriate output value corresponding to the throttle valve opening at another point can be calculated.

Thus, according to the rotational angle output regulating method of this embodiment, when there are three specific write points of output values corresponding to predetermined throttle openings of the throttle valve 12, the second and third steps are repeated three times successively. The second step involves adjusting the throttle valve 12 to predetermined throttle openings through an encoder, for example, connected to the rotary shaft 13 and fixing it to the throttle openings temporarily. The third step involves writing output values corresponding to the predetermined throttle openings of the throttle valve 12 fixed temporarily in the second step into the Hall ICs 31 and 32 using a program board connected to the signal input terminal (VDD) 41 and output take-out terminals (OUT1) 42 and (OUT2) 43. An output value at another point is calculated by a linear approximate interpolation among the three points thus written.

That is, the output regulating work performed where there are three write points in writing throttle opening output values of the throttle valve 12 into the Hall ICs 31 and 32 merely comprises writing the throttle opening output values at the three specific points into the Hall ICs 31 and 32 in three steps repeatedly. Subsequent linear approximate interpolation is used among the three points to calculate an output value at another point. Thus, the output regulation is easy and it is possible to improve the output accuracy.

Figure 9:
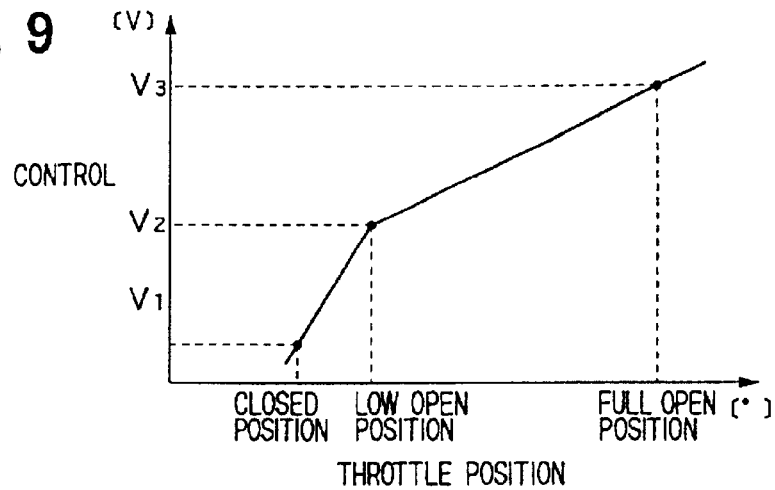
FIG. 9 is a diagram illustrating a first modification of output regulation by three-point write in the throttle opening sensor for an intake volume control apparatus for an internal combustion engine according to the present invention.

Next, with reference to FIGS. 1 and 9, a first modification of the present invention is provided. In the completely mounted state of the intake volume control apparatus for an internal combustion engine shown in FIG. 1 and with the cap 18 removed from the throttle body 10, an encoder (not shown) is connected to a slit portion (not shown) of the rotary shaft 13. Then, the rotary shaft 13 is rotated to give throttle openings [°] at three specific points [fully closed position (see FIG. 4), low opening (idling) position (see FIG. 5), and fully open position (see FIG. 6) of the throttle valve 12, and is fixed temporarily to each point. Predetermined regulated outputs V1, V2, and V3 [V] corresponding respectively to the throttle openings at the fully closed position, low opening position, and fully open position are written into the Hall ICs 31 and 32. In this case, the regulated outputs V1, V2, and V3 as write signals are written through an externally connected program board using the signal input terminal (VDD) 41 and output take-out terminal (OUT1) 42 for the Hall IC 31 and using the signal input terminal (VDD) 41 and output take-out terminal (OUT2) 43 for the Hall IC 32. At the same time, there are write processings as temperature characteristic correction, gain correction, and offset correction. Thereafter, the encoder and the program board are removed and the cap 18 is fitted in the throttle body 10 to complete the output regulating work.

Thus, the output regulating work by three-point write in the throttle opening sensor 30 merely comprises successively rotating and temporarily fixing the rotary shaft 13 to each of the throttle openings at the three specific points and writing write signals corresponding to these points. Based on the regulated outputs V1, V2, and V3 at the three specific points (fully closed position, low opening position, and fully open position) thus written, an output value from the throttle opening sensor 30 at another point is calculated by a linear interpolation between two adjacent points, as shown in FIG. 9.

Thus, in the rotational angle output regulating method according to this modification, when there are three specific write points corresponding to predetermined throttle openings of the throttle valve 12, the throttle valve is adjusted to predetermined throttle openings through an encoder connected to the rotary shaft 13. Then the second and third steps are repeated successively. The second step being a temporary fixing step. The third step involves writing output values corresponding to the predetermined throttle openings of the throttle valve 12 fixed temporarily in the second step into the Hall ICs 31 and 32 through a program board connected to the signal input terminal (VDD) 41 and output take-out terminals (OUT1) 42 and (OUT2) 43. An output value at another point is calculated by linear interpolation between adjacent points out of the three points.

The output regulating work performed where there are three specific write points in writing output values corresponding to throttle openings of the throttle valve 12 into the Hall ICs 31 and 32 merely comprises writing the throttle opening output values at the three specific points into the Hall ICs 31 and 32 in three steps repeatedly. An output value at another point is then calculated by interpolation between two adjacent points out of the three points.

Figure 10:
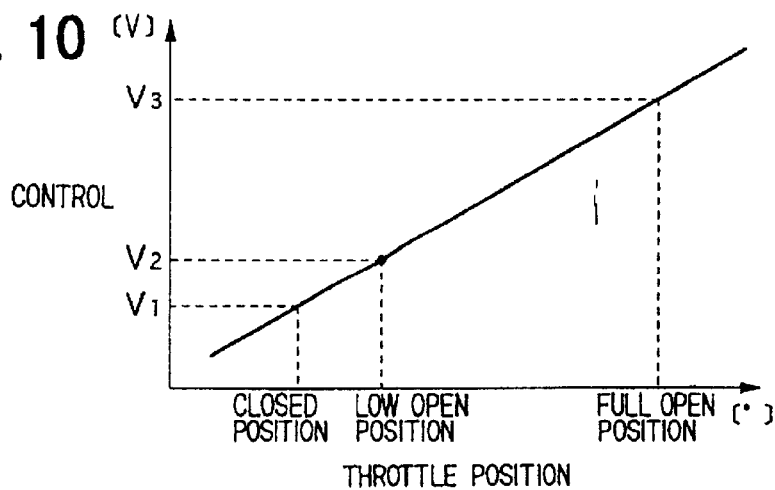
FIG. 10 is a diagram illustrating a second modification of output regulation by three-point write in the throttle opening sensor for an intake volume control apparatus for an internal combustion engine according to the present invention.

With reference to FIGS. 1 and 10, the following description is provided for a second modification of the present invention. In the completely mounted state of the intake volume control apparatus for an internal combustion engine shown in FIG. 1 and with the cap 18 removed from the throttle body 10, an encoder (not shown) is connected to a slit portion (not shown) of the rotary shaft 13. The rotary shaft 13 is rotated to give throttle openings [°] at three specific points of the throttle valve 12 of which one point is the low opening (idling) position (see FIG. 5), and is fixed to each point temporarily. Predetermined regulated outputs V1, V2, and V3 [V] corresponding to throttle openings at the three specific points including the low opening position are written into the Hall ICs 31 and 32. In this case, the regulated outputs V1, V2, and V3 as write signals are written through an externally connected program board (not shown) using the signal input terminal (VDD) 41 and output take-out terminal (OUT1) 42 for the Hall IC 31 and using the signal input terminal (VDD) 41 and output take-out terminal (OUT2) 43 for the Hall IC 32. At the same time, there are performed such write processings as temperature characteristic correction, gain correction, and offset correction. Thereafter, the encoder and the program board are removed and the cap 18 is fitted in the throttle body 10 to complete the output regulating work.

As noted above, the output regulating work by three-point write in the throttle opening sensor 30 merely comprises turning the rotary shaft 13 successively to throttle openings at three specific points including the low opening position, fixing it to each point temporarily, and writing write signals corresponding to those points. Then, based on regulated outputs V1, V2, and V3 at the three specific points including the low opening position thus written, an output value from the throttle opening sensor 30 at another point is calculated by a linear interpolation between two adjacent points.

Thus, in the rotational angle output regulating method according to this modification, the shaft portion of the rotary member is the rotary shaft 13 of the throttle valve 12 in the internal combustion engine and one specific write point out of write points of output values corresponding to predetermined throttle openings of the throttle valve is set to the low opening position of the valve.

The output regulating work performed in setting one specific write point out of output value write points to the low opening position merely comprises writing output values corresponding to throttle valve openings at write points including the low opening position into the Hall ICs 31 and 32 repeatedly by the number of write points. For example, by a linear interpolation between two adjacent points out of the write points there is calculated an output value at another point. Thus, the output regulation is easy and it is possible to improve the output accuracy of output values in the vicinity of the set low opening position.

Figure 11:
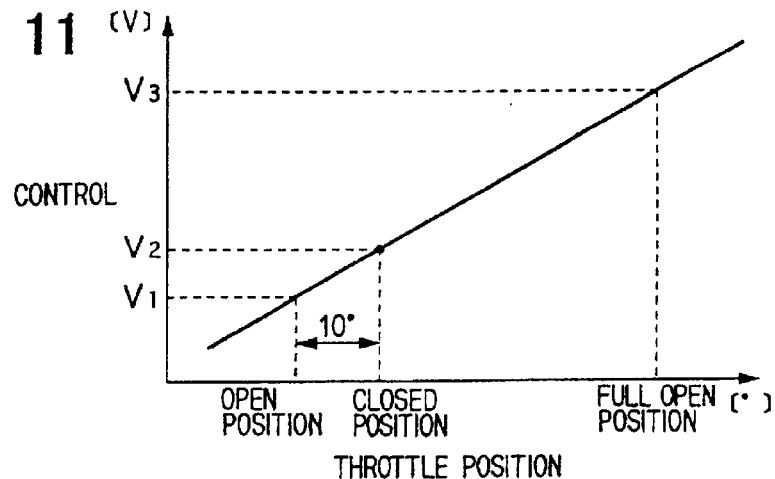
FIG. 11 is a diagram illustrating a modification of output regulation by two-point write in the throttle opening sensor for an intake volume control apparatus for an internal combustion engine according to the present invention.

Next, with reference to FIGS. 1 and 11, a description will be given below about a modification of the output regulation by two-point in the throttle opening sensor 30 mounted to the intake volume control apparatus for an internal combustion engine according to the above embodiment.

In the completely mounted state of the intake volume control apparatus for an internal combustion engine shown in FIG. 1 and with the cap 18 removed from the throttle body 10, an encoder (not shown) is connected to a slit portion (not shown) of the rotary shaft 13. Then, the rotary shaft 13 is turned to two specific throttle openings [°] of the throttle valve 12. For example, at the partially open position (see FIG. 3) and the fully closed position (see FIG. 4) shifted 10 [°] to the open side from the partially open position, the shaft is fixed to each point temporarily. Predetermined regulated outputs V1 and V2 [V] corresponding to the throttle openings at those two points are written into the Hall ICs 31 and 32. In this case, the regulated outputs V1 and V2 as write signals are written through an externally connected program board (not shown) using the signal input terminal (VDD) 41 and output take-out terminal (OUT1) 42 for the Hall IC 31 and using the signal input terminal (VDD) 41 and output take-out terminal (OUT2) 43 for the Hall IC 32. At the same time, write processings are performed such as temperature characteristic correction, gain correction, and offset correction. Thereafter, the encoder and the program board are removed and the cap 18 is fitted in the throttle body 10 to complete the output regulating work.

As noted above, the output regulating work by two-point write of the throttle opening sensor 30 merely comprises turning the rotary shaft 13 successively to the throttle openings at the two specific points, fixing it to each point temporarily, and writing the write signals corresponding to the points. Based on the regulated outputs V1 and V2 at the two specific points (the partially open position and the fully closed position) thus written, an output value from the throttle opening sensor 30 corresponding to the throttle opening at another point is calculated by a linear interpolation between the two points.

Thus, in the rotational angle output regulating method according to this modification, the shaft portion of the rotary member is the rotary shaft 13 of the throttle valve 12 in the internal combustion engine and one specific point out of write points of output values corresponding to throttle openings of the throttle valve 12 is set, as the fully closed position of the throttle valve opening, a position returned to the open side by a predetermined throttle opening from the partially open position which is a mechanical stopper position past the minimum flow position.

That is, the output regulating work performed when setting one of the output value write points to a position turned to the open side by a predetermined throttle opening from the partially open position merely comprises writing output values corresponding to throttle openings of the throttle valve 12 at plural specific points including the position into the Hall ICs 3 and 32 in plural steps repeatedly. For example, a linear interpolation is made between two adjacent points out of the plural points to calculate an output value at another point. Consequently, output regulation is easy and it is possible to improve the output accuracy of an output value in the vicinity of a position rotated to the open side by a predetermined throttle opening from the partially open position.

Although in the above embodiment and modifications the present invention is applied to the throttle opening sensor mounted to the intake volume control apparatus for an internal combustion engine, this constitutes no limitation in practicing the present invention. The invention is also applicable to any other sensors insofar as the sensors are for detecting a rotational angle of a rotary member.

One specific write point may be set to the partially open position of the throttle valve opening when the ignition switch is on and the partially open position may be used as a learning position. By so doing, the partially open position of the throttle valve opening is updated at every start-up of the internal combustion engine and another output value of a throttle opening is corrected and calculated corresponding to the partially open position. Therefore, even if the partially open position varies with the lapse of time, output values from the Hall ICs 31 and 32 in the throttle opening sensor 30 can be properly corrected.

A method for calibrating a rotational sensor of a motor driven throttle valve system for an engine according to a second embodiment will be described.

Figure 12:
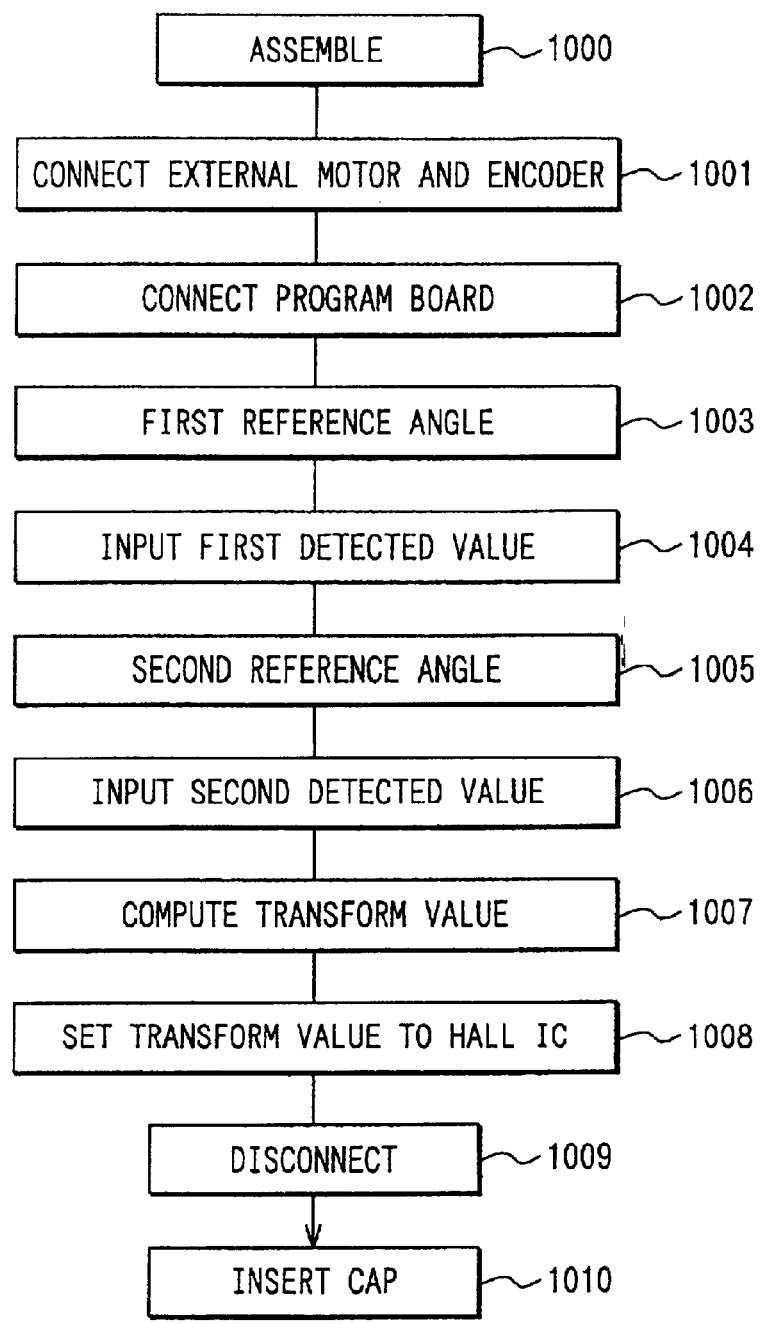
FIG. 12 shows an assembling process of the motor driven throttle valve system.
Figure 13:
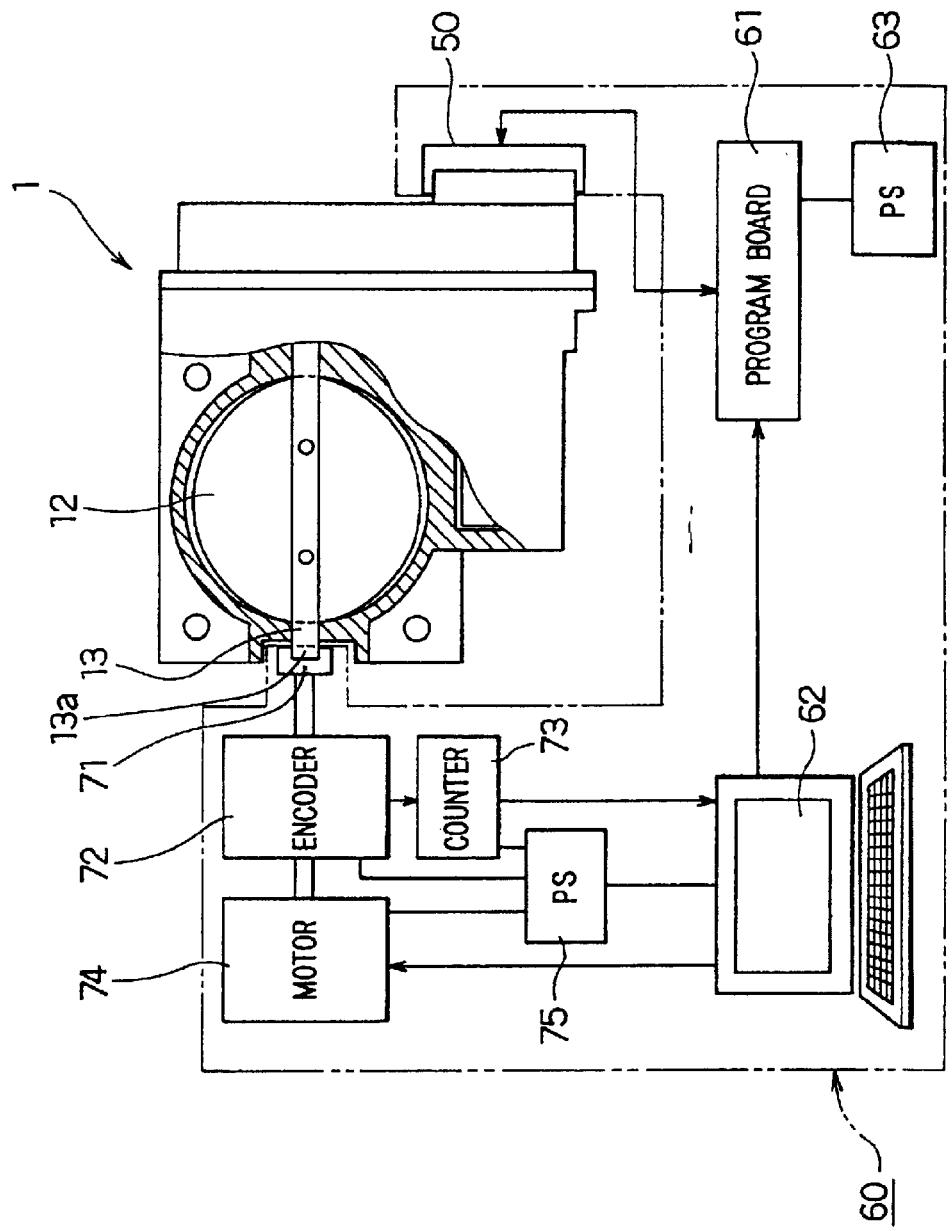
FIG. 13 shows a configuration of an external calibration device.

FIG. 12 shows an assembling process of the motor driven throttle valve system. This process includes calibrating steps. FIG. 13 shows a configuration of an external calibration device, and FIG. 14 shows a configuration of Hall ICs 31 and 32.

The structure of the motor driven throttle valve system 1 is shown in FIG. 1. A throttle valve 12 rotates across full-throttle position (also called full-open position), totally-closed position (also called full-close position) and opener position (also called over-turn or partially open position). Opener or partially open position (FIG. 3) is different from low open position (FIG. 5). A throttle valve 12 rests on a stopper in the opener position. The opener position is a position that permits the throttle to be open to a small degree, relative to a full-open position. The opener position may be an open position whereby the throttle valve 12 is rotated in the opposite direction from its normal rotational direction.

Figure 14:
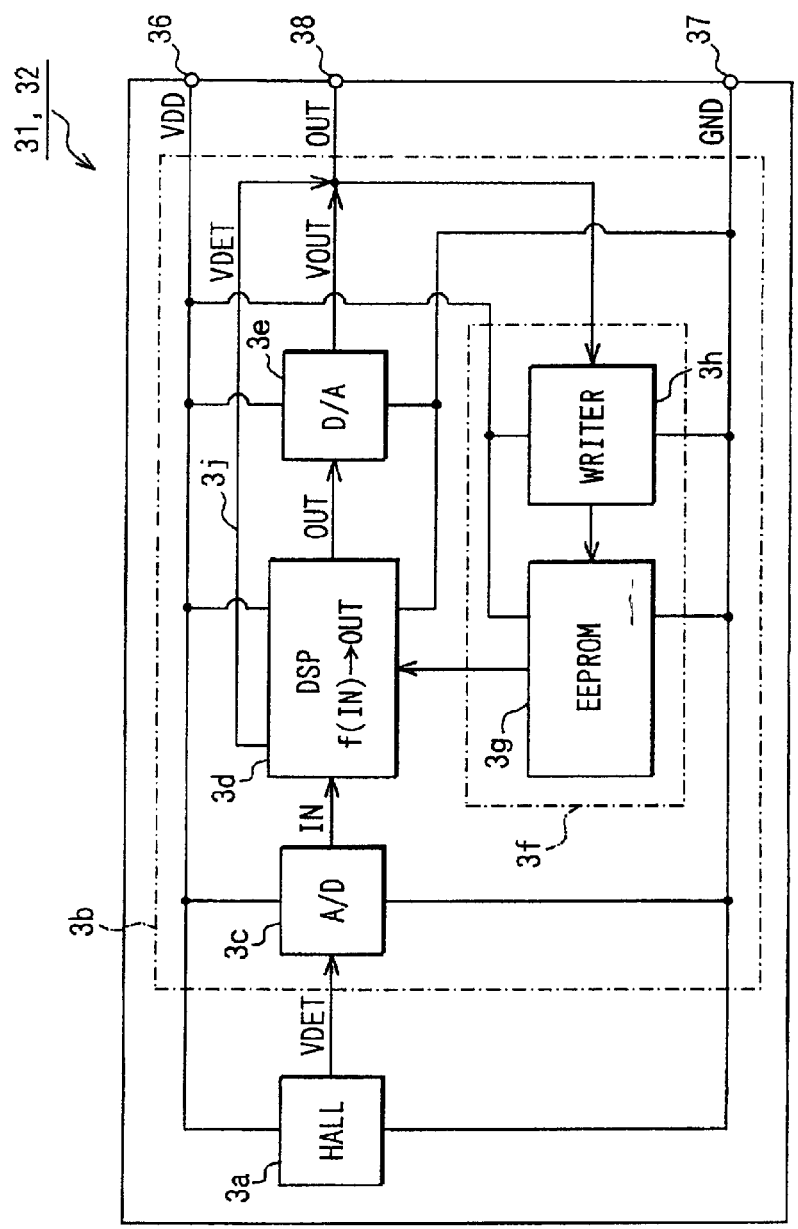
FIG. 14 shows a configuration of Hall ICs 31 and 32.

The Hall ICs 31 and 32 have the same configuration as shown in FIG. 14. The Hall ICs have a Hall-effect element 3a and an output circuit 3b. The output circuit 3b performs as an amplifier circuit and a converter circuit, and has an AD converter 3c, a digital signal processor (DSP) 3d and a digital to analog (DA) converter 3e. The output circuit 3b further includes a setting circuit 3f. The setting circuit 3f includes an electrically erasable programmable read-only memory (EEPROM) 3g and an EEPROM writer circuit 3h.

A detected value VDET of the Hall-effect element 3a is input to the digital signal processor (DSP) 3d via the AD converter 3c. The DSP 3d converts an input value IN to an output value OUT based on the transforming characteristic f and outputs the value OUT. The output OUT of the DSP 3d is output as an analog output VOUT via the DA converter 3e. The EEPROM writer circuit 3h is activated by terminals 36, 37 and 38. The EEPROM writer circuit 3h writes data input from the terminals 36, 37 and 38 into the EEPROM 3g. The DSP 3d outputs the detected value VOUT as a digital value via a bypass line 3i. Therefore, the output VOUT and the detected value VDET appear at the terminal 38 in the form of an analog signal and digital signal, respectively. The Hall ICs 31 and 32 can further include an amplifier block.

The transforming characteristic f of the DSP 3d is an arbitrary function. For instance, a proportional function can be used. In this case, the transforming characteristic can be expressed as follows: OUT=a*IN+b. Transforming values that define the transforming characteristic f are stored in the EEPROM 3g. The transforming characteristic f is adjustable through the transforming values. For instance, a proportionality coefficient "a" as a gain and a proportionality constant "b" as an offset, are stored. Therefore, the DSP 3d converts the detected value VDET to the output value VOUT based on the transforming values stored in the EEPROM 3g and a predetermined function.

The EEPROM 3g can store the function f. Any one of an upper limit value, a lower limit value and a filter process constant can be used as the transforming value. Compensating values for compensating temperature characteristics of Hall effect elements can be stored. The temperature characteristic compensation is performed by a bias of the Hall-effect element 3a, or a computation of the DSP 3d. The DSP 3d can be replaced with an operational amplifier. The EEPROM 3g can be replaced with other types of memory devices or a variable resistor.

Initial values are set in the EEPROM 3g. MICRONAS 804A, for instance, can be used for the Hall ICs 31 and 32.

To begin, the motor driven throttle valve device 1 is assembled. In assembling step 1000, all parts except for a cap 18 are mounted to the throttle body 10.

In steps 1001 and 1002, the external calibration device 60 is connected to the device 1. An encoder 72 and an external motor 74 are connected to a connecting portion 13a of the shaft 13 via a coupling 71. Outputs of the encoder 72 are counted by a counter 73 and input to a microcomputer 62. The microcomputer 62 is connected to the encoder 72 and the external motor 74. A power supply circuit 75 supplies power to the microcomputer 62, external motor 74 and encoder 72. A connector 50 is connected to terminals 51 through 54 (FIG. 2). A program board 61 is connected to the connector 50. Power is supplied to the program board 61 from the power supply circuit 63. The microcomputer 62 drives the throttle valve 12 through the external motor 74. The microcomputer 62 is connected to the program board 61 and performs transmit/receive operations of signals. The program board 61 receives the detected value VDET from the Hall ICs 31 and 32, calculates the transforming values by predetermined calculation processes, and sets the transforming values for each of the Hall ICs 31 and 32.

In step 1003, the microcomputer 62 rotates the throttle valve 12 to the first angle through the external motor 74. The encoder 72 is used for feeding back the angle of the throttle valve 12.

In step 1004, the program board 61 receives the first detected value VDET1 and stores it as a measured value.

In step 1005, the microcomputer 62 rotates the throttle valve 12 to the second angle through the external motor 74.

In step 1006, the program board 61 receives the second detected value VDET2 from the Hall ICs 31 and 32, and stores it as a measured value.

In step 1007, transforming values for adjusting the output values VOUT from the Hall ICs 31 and 32 to the predetermined reference values is calculated by the program board 61. The first reference output value VREF1 for the first angle and the second reference output value VREF2 for the second angle are stored in the program board 61 in advance. The program board 61 calculates the transforming values so that the DSP 3d outputs the first reference output value VREF1 when the first detected value VDET1 is input or the second reference output value VREF2 when the second detected value VDET2 is input. The program board 61 calculates the transforming values by solving simultaneous equations provided based on the known function f. For instance, the transforming values "a" and "b" are determined by the simultaneous equations VREF1=a×VDET1+b and VREF2=a×VDET2+b.

In step 1008, the program board 61 sets the transforming values in the Hall ICs 31 and 32. It also stores the temperature compensation value.

In step 1009, the external calibration device 60 is disconnected.

In step 1010, the cap 18 is mounted. The assembly of the device 1 is complete.

A calibration process shown in FIG. 12 is performed for each Hall IC 31, 32. Upon completion of the calibration process of each Hall IC 31, 32, the transforming value of each Hall IC 31, 32 is computed and set.

Figure 15:
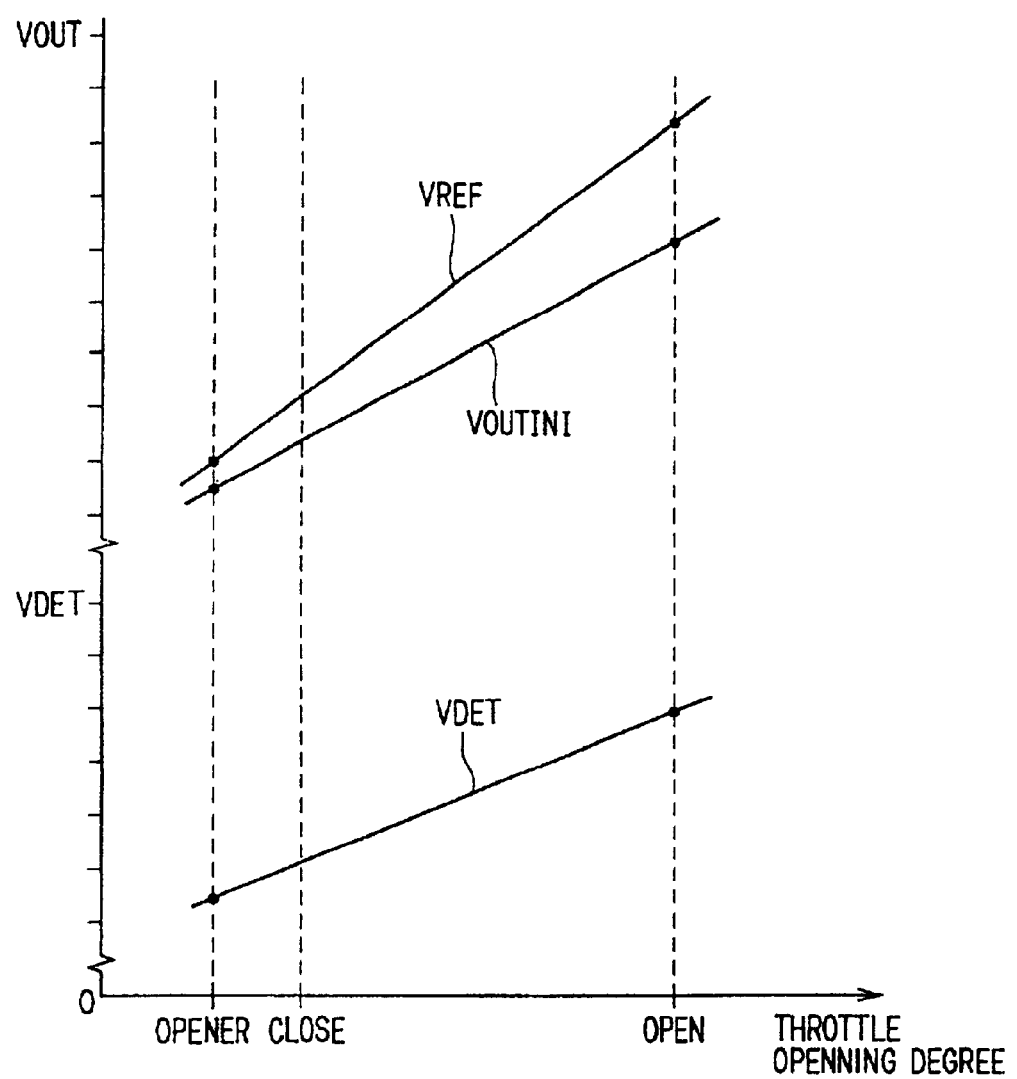
FIG. 15 is a graph showing the detected values VDET, the reference output values VREF and initial output values VOUTINI against a throttle opening degree.

In each Hall IC 31, 32, after the calibration process, the detected value VDET of the Hall effect element 3a is transformed to the output value VOUT by applying the transforming value to the detected value VDET, and the output value VOUT is output from the Hall IC 31, 32. The output value VOUT shows output characteristics taking the form of a straight line, which passes through the first reference output value VREF1 at the first reference angle and also through the second reference output value VREF2 at the second reference angle. As a result, the Hall IC 31, 32 outputs the predetermined output values throughout its detection range. FIG. 15 shows the detected values VDET, the reference output values VREF and initial output values VOUTINI. The initial output values VOUTINI are obtained using the transforming value, which was initially set. The first reference angle is set at the opener position, and the second reference angle is set at the full open position. In this way, the predetermined reference output values VREF can be obtained throughout the rotational range of the throttle valve 12.

In the present embodiment, the transforming value is set after the components, which have an influence on the output of each Hall IC 31, 32, are all assembled. Thus, the transform characteristic of the output circuit compensates for the influences of all of the components. For example, mechanical dimensional errors and assembling errors of the motor driven throttle device, dimensional errors and assembling errors of the rotational angle sensor, which includes the Hall ICs 31, 32, the magnetic errors of the magnets and electrical errors of the circuit are compensated.

Figure 16:
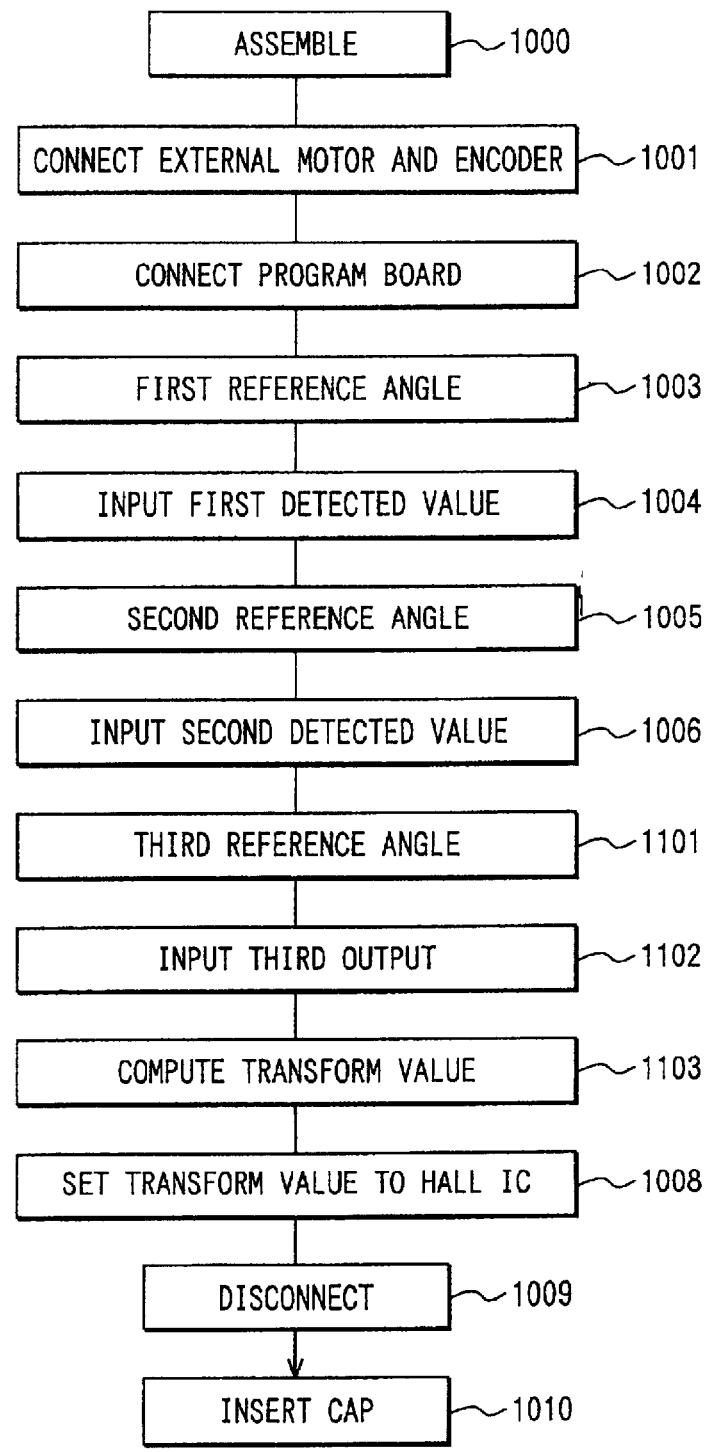
FIG. 16 shows a calibration process according to a third embodiment of the present invention.
Figure 17:
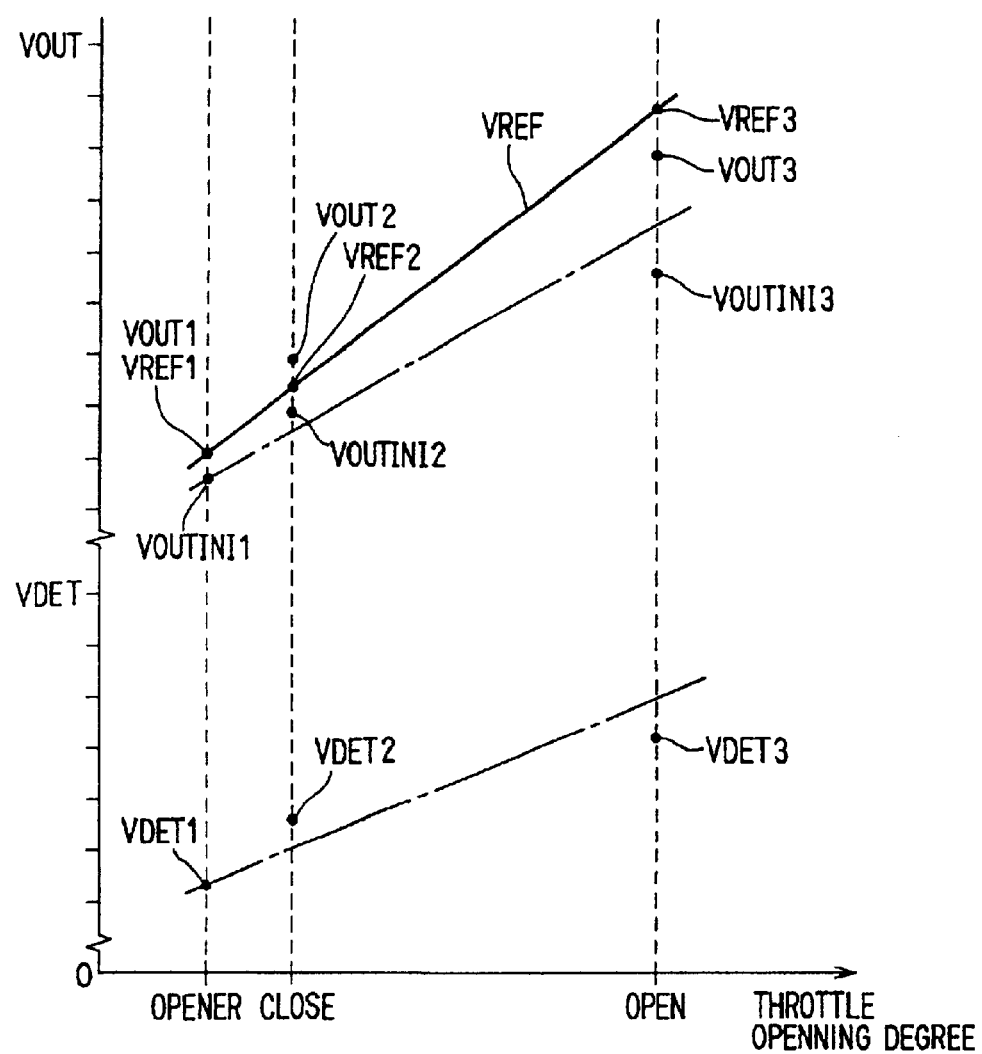
FIG. 17 is a graph showing the detected values and the output values of the third embodiment.

FIG. 16 shows a calibration process according to a third embodiment of the present invention. FIG. 17 is a graph showing the detected values and the output values according to the third embodiment. In this embodiment, the components similar to those already discussed are indicated with like reference numerals so descriptions of those components will not be repeated.

At steps 1101 and 1102, a third detected value measured at a third reference angle is input to the program board. Thus, the detected values VDET1, VOUT2, VDET3 are measured at the three reference angles, respectively. At step 1103, the transforming value is computed based on the first to third detected values VDET1, VDET2, VDET3. The transforming value is chosen such that the output values VOUT1, VOUT2, VOUT3 substantially coincide with or are most closely approximated to the reference output values VREF1, VREF2, VREF3, respectively. For instance, an approximation process or a process of applying a correlation function can be used for this purpose.

Figure 18:
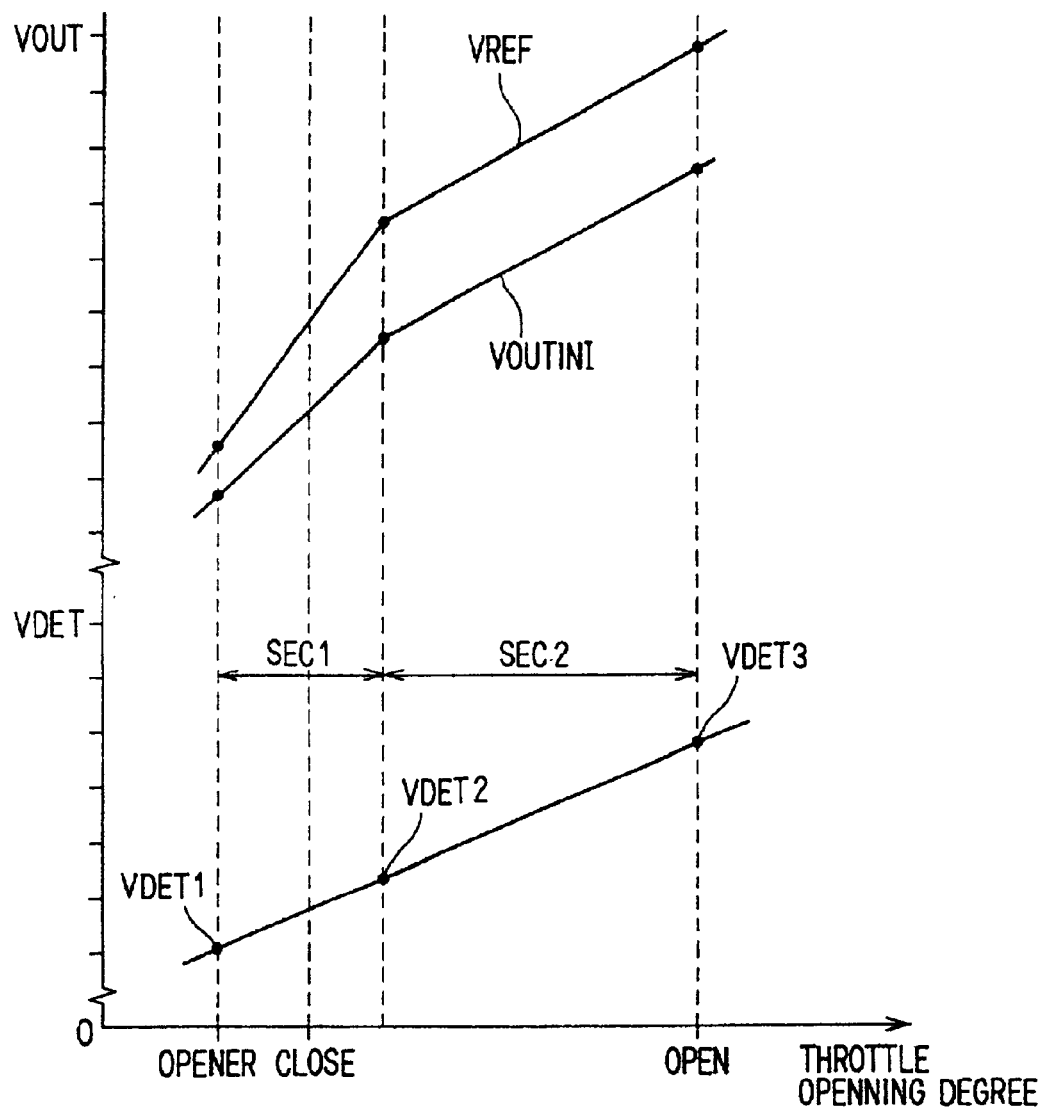
FIG. 18 is a graph showing the detected values and the output values according to a fourth embodiment of the present invention.

FIG. 18 is a graph showing the detected values and the output values according to a fourth embodiment of the present invention. In this embodiment, at step 1103 in FIG. 16, the transforming value, which defines output characteristics taking the form of a bent line, is computed based on the first to third detected values. In this embodiment, the output circuit 3b exhibits first and second transform characteristics. The first characteristics are exhibited in a section SEC1 between the first reference angle and the second reference angle. The second transform characteristics are exhibited in a section SEC2 between the second reference angle and the third reference angle. The second reference angle preferably corresponds to a relatively smaller opening degree of the throttle valve. The first transform characteristics are achieved with the relatively large proportionality constant. Thus, a relatively high resolution is achieved in the small opening degree range of the throttle valve. At step 1103, a first transforming value for the first transform characteristics and a second transforming value for the second transform characteristics are computed. As a result, the output characteristics, which take the form of the bent line, can be obtained with the first and second transforming values.

The three reference angles can correspond to the opener position, the full closed position and the full open position, respectively. Alternatively, the three reference angles can correspond to the full closed position, the intermediate position and the full open position, respectively. The three reference angles do not necessarily correspond to these positions and can correspond to positions near these positions.

The program board 61 can use the initial output value VOUTINI in place of the detected value VDET. In this case, the transforming value is computed based on a difference between the initial output value VOUTINI and the reference output value VREF.

The present invention can be applied to any device, which measures a rotational angle of a rotatable body.

While the above-described embodiments refer to examples of usage of the present invention, it is understood that the present invention may be applied to other usage, modifications and variations of the same, and is not limited to the disclosure provided herein.

What is claimed is:

1. A rotational angle output regulating method comprising:

mounting a sensing unit including a non-contact type sensing element disposed so as to form a gap with a magnet, the magnet rotating integrally with a shaft portion of a rotary member, the non-contact type sensing element detecting a rotational angle of the rotary member using a magnetic field generated by the magnet;

operatively connecting a rotational angle detection member to the shaft portion of the rotary member at an end opposite where the magnet is disposed, and adjusting and temporarily fixing the rotary member at a first predetermined rotational angle;

outputting an original output signal indicating the first predetermined rotational angle of the rotary member, and thereafter disconnecting the rotational angle detection member from the shaft, wherein said magnet is a cylindrical magnet and said sensing unit is mounted so that said non-contact sensing element is facing an inner periphery of said cylindrical magnet.

2. A rotational angle output regulating method according to claim 1, wherein:

a second output value at a second rotation angle of the rotary member is determined based on the original output signal and a present gradient corresponding thereto, wherein the preset gradient permits the second rotary member position to be determined even when there is only one original output signal.

3. A rotational angle output regulating method according to claim 2, wherein:

the shaft portion of the rotary member is a rotary shaft of a throttle valve in an internal combustion engine and said first predetermined rotational angle corresponds to one of a low opening position and a fully closed position of the throttle valve.

4. A rotational angle output adjusting method according to claim 2, wherein:

the shaft portion of the rotary member is a rotary shaft of a throttle valve in an internal combustion engine; and said first predetermined rotational angle corresponds to an open side by a predetermined degree of a throttle valve from an initial opening position as a mechanical stopper position, past a fully closed position of the throttle valve as a minimum flow position.

5. A rotational angle output adjusting method according to claim 2, wherein:

the shaft portion of the rotary member is a rotary shaft of a throttle valve in an internal combustion engine; and said first predetermined rotational angle corresponds to an initial opening position of the throttle valve in an ON condition of an ignition switch in the internal combustion engine, the initial opening position serving as a learning position.

6. A rotational angle output regulating method according to claim 1, wherein:

the operatively connecting a rotational angle detection member step and the outputting an original output signal indicating step are repeated twice successively to generate two respective output signals corresponding to two rotational angles of the rotary member; and a third signal is determined corresponding to a third rotational angle of the rotary member based on a linear interpolation between said two respective output signals.

7. A rotational angle output regulating method according to claim 1, wherein:
the operatively connecting a rotational angle detection member step and the outputting an original output signal indicating step are repeated three times successively to generate three respective output signals corresponding to three rotational angles of the rotary member; and
a linear approximation interpolation is used to determine a fourth output signal corresponding to a fourth rotational angle of the rotary member based on the three respective output signals.

8. A rotational angle output regulating method according to claim 1, wherein:
the operatively connecting a rotational angle detection member step and the outputting an original output signal indicating step are repeated three times successively to generate three respective output signals corresponding to three rotational angles of the rotary member; and
a linear interpolation is made between two adjacent signals out of the three respective output signals to determine a fourth signal corresponding to a fourth position of the rotary member.

9. A rotational angle output regulating method comprising:
mounting a closed magnetic field sensing unit, wherein the sensing unit includes a non-contact type sensing element disposed so as to form a gap with a magnet;
rotating the magnet integrally with a shaft portion of a rotary member, the non-contact type sensing element magnetically detecting a rotational angle of the rotary member;
detecting a rotational angle, by the non-contact type sensing element, of the rotary member using a closed magnetic field generated by the magnet;
connecting a rotational angle detection member, at an end opposite the magnet, to the shaft portion of the rotary member;
adjusting the rotary member to a first predetermined rotational angle;
outputting an original output signal indicating the first predetermined rotational angle of the rotary member; and
disconnecting the rotational angle detection member from the shaft, wherein said magnet is a cylindrical magnet and said sensing unit is mounted so that said non-contact type sensing element is facing an inner periphery of said cylindrical magnet.

10. A method for calibrating a throttle valve device, the device comprising a throttle valve, an internal motor for driving the throttle valve, a rotation angle detector which outputs a detected value indicative of a rotation angle of the throttle valve, and an output circuit which includes a setting circuit in which a transforming characteristic is set from an external device, transforms the detected value to an output value in accordance with the transforming characteristic, and output the output value, the method comprising the steps of:
assembling the throttle valve, the internal motor, the rotation angle detector, and the output circuit into the throttle valve device;
connecting an external motor with the throttle valve, and an external calibrating circuit with the output circuit;
measuring the detected value or the output value as a measured value by the external calibrating circuit, the measured value being measured when the throttle valve is rotated to a reference angle by the external motor;
defining a transforming characteristic based on the measured value and a reference output value to be output at the reference angle, the transforming characteristic being defined so that the output circuit outputs the reference output value at the reference angle;
setting the defined transforming characteristic into the setting circuit from the external calibrating circuit; and
disconnecting the external motor and the external calibrating circuit.

11. The method for calibrating the throttle valve device claimed in claim 10, wherein the throttle valve device has a connecting portion in which the external motor is connected, and a cover member for covering the connecting portion, and wherein the method further comprises assembling the cover member to the throttle valve device after the disconnecting step.

12. The method for calibrating the throttle valve device claimed in claim 10, wherein the measured value is one of a plurality of measured values measured by repeating the measuring step, and the transforming characteristic is defined based on the plurality of measured values.

13. The method for calibrating the throttle valve device claimed in claim 10, wherein the transforming characteristic includes a functional equation and a coefficient of the functional equation, and the coefficient is set in the setting step.

* * * * *